March 4, 1952 R. J. BREIT ET AL 2,588,202
CONTROL VALVE
Filed April 6, 1946 2 SHEETS—SHEET 1

INVENTOR.
ROBERT J. BREIT
BY HERMAN C. SCHROEDER

*Frank H. Harmon*
ATTORNEY

March 4, 1952 R. J. BREIT ET AL 2,588,202
CONTROL VALVE
Filed April 6, 1946 2 SHEETS—SHEET 2
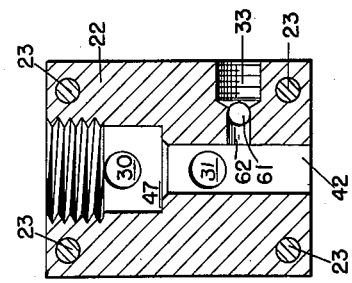
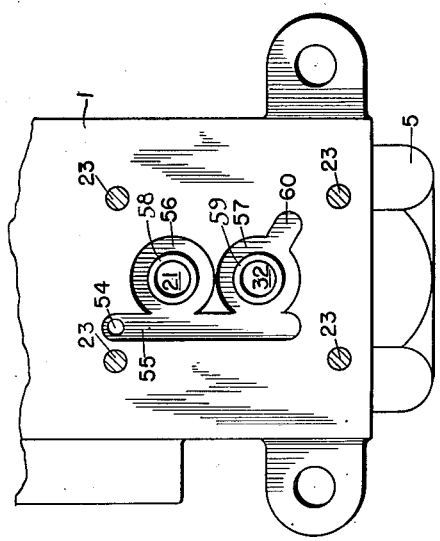
INVENTOR.
ROBERT J. BREIT
BY HERMAN C. SCHROEDER
ATTORNEY Patented Mar. 4, 1952

2,588,202

UNITED STATES PATENT OFFICE 2,588,202

CONTROL VALVE

Robert J. Breit, San Antonio, Tex., and Herman C. Schroeder, Parma, Ohio, assignors to Jack & Heintz Precision Industries, Inc., Cleveland, Ohio, a corporation of Delaware Application April 6, 1946, Serial No. 660,262

1 Claim. (Cl. 137—139)

This invention relates to valves and more particularly to pressure sensitive control valves for use in hydraulic systems and has for one of its primary objects to provide a valve which will prevent any discharge of fluid from the valve below a set inlet pressure.

A further object is to provide a pressure sensitive control valve for use with a pressure accumulator to limit the pressure drop of the accumulator to any predetermined degree.

Another object is to provide a simple manually operated positive control valve for use in high pressure hydraulic systems.

With the foregoing and other objects in view the invention resides in the following specification and appended claim, certain embodiments and details of construction of which are shown in the attached drawings in which:

Figure 3 is a view in section taken along line 3—3 of Figure 1;

Figure 4 is a view in section taken along line 4—4 of Figure 1 with the plug and valve removed from the passage in the auxiliary valve body.

Figure 1:
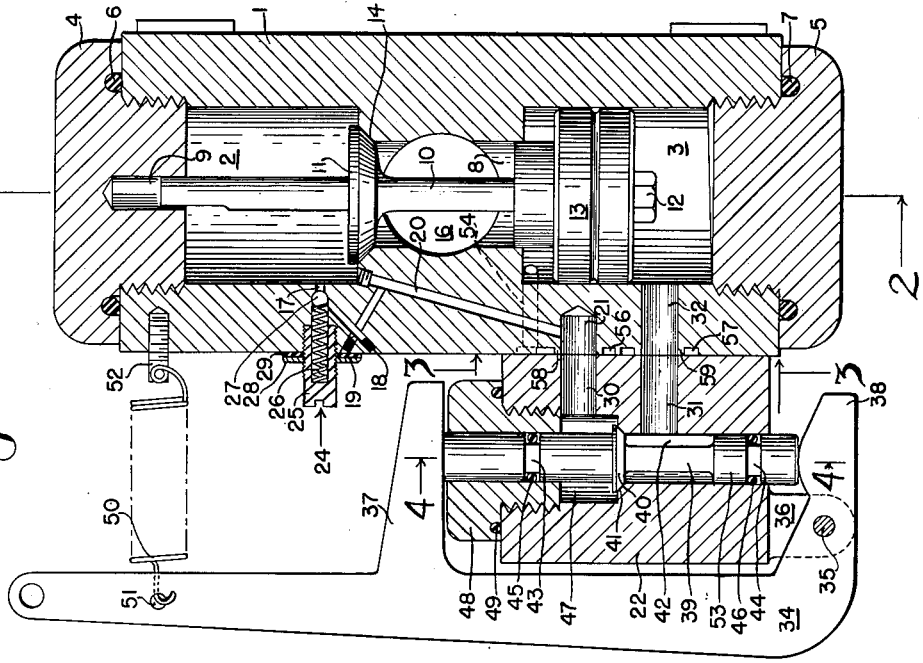
Figure 1 is a view in vertical section of the valve in its closed position.
Figure 2:
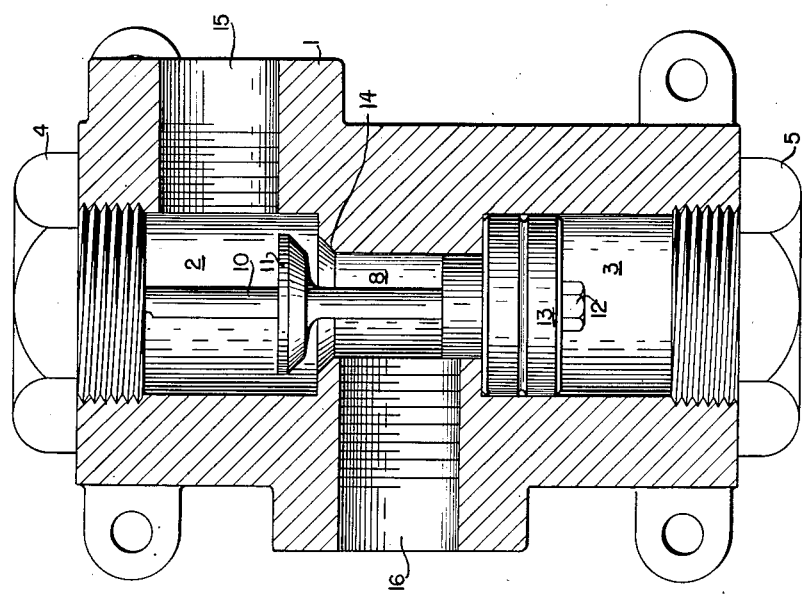
Figure 2 is a view in section taken along line 2—2 of Figure 1, the valve being shown in its open position.

Referring more particularly to the drawings in Figure 1, a valve body 1 is shown having two opposed axial cylindrical recesses 2 and 3. The end of each recess is threaded to receive plugs 4 and 5 which are undercut to accommodate pressure fluid sealing rings 6 and 7.

Joining the two recesses 2 and 3 in a passage 8 which has a smaller cross-sectional area than the two recesses. Extending from recess 3 through passage 8 into recess 2 and on into a guide passage 9 in plug 4 is an upper valve stem 10 which has a bevelled disc valve portion 11 bridging one end of passage 8. Threadably secured to the lower end of lower valve stem 10 by means of nut 12 is a piston 13. The under side of bevelled disc valve 11 seats against the bevelled seat 14 of the valve body 1 when piston 13 is in its retracted position. An inlet passage 15 to the valve body 1 is shown terminating in recess 2 while an outlet passage 16 is shown starting in passage 8.

The valve body 1 has communicating fluid passages 17, 18, 19, 20 and 21 which direct pressure fluid from recess 2 to an auxiliary valve boly 22 which is secured to valve body 1 by screws 23. An adjustable ball relief valve assembly 24 is provided having a threaded body portion 25, a spring 26 within said body portion, a ball 27 normally engaging the valve body 1 to close passage 17 under pressure of spring 26, a lock nut 28 for locking the valve in any adjusted position and a fluid seal 29 between the lock nut and the body 1.

The auxiliary valve body 22 has an inlet passage 30 to receive fluid from passage 21 in body 1, an outlet passage 31 to direct fluid back into body 1 by means of a passage 32 into recess 3, and a sump outlet 33. Pivoted about auxiliary valve body 22 on a pivot 35 in boss 36 is an operating lever 34 having legs 37 and 38. Each leg engages an end of a spool valve 39 in valve body 22. A bevelled disc 40 on valve 39 engages bevelled seat 41 at the end of a passage 42 in the body 22 to separate the inlet passage 30 from outlet passage 31. The valve 39 has undercut sections 43 and 44 to accommodate pressure fluid seals 45 and 46. The valve body 22 has a recess 47 which receives pressure fluid from passage 30. A threaded tubular plug 48 is shown screwed into valve body 22 about valve 39 and is provided with a pressure fluid seal 49 in an undercut in the valve body to effectively prevent leakage. A spring 50 is shown connected from a hole 51 in operating lever 34 to a pin 52 in valve body 1 to normally hold the lever in an inoperative position.

With the valve in the inoperative position as in Figure 1, pressure fluid is present in inlet 15, recess 2, passages 17, 18, 19, 20, 21, 30 and in recess 47 of valve body 22. The pressure fluid holds disc 11 of valve stem 10 in firm engagement with seat 14 positively separating inlet passage 15 from outlet passage 16.

When the operating lever 34 is moved counterclockwise about pin 35 as a pivot against the action of spring 50, valve 39 is forced upwardly by leg 38 of the lever 34, displacing disc 40 from its seat 41 in valve body 22. Also a land 53 of valve 39 is moved so as to block the sump outlet 33. Pressure fluid is then free to flow round disc 40 through passage 42 into outlet passage 31 of valve body 22, from there into passage 32 of valve body 1 and finally into recess 3 below piston 13. As the pressure builds up under piston 13 valve stem 10 is moved upward and disc 11 is displaced from its seat 14. This is possible due to the fact that the piston 13 has a larger cross-sectional area than does the disc 11. Pressure fluid is then free to flow from inlet passage 15 around disc 11 into passage 8 and out through outlet passage 16.

Pressure fluid will continue to flow with the lever 34 in its operative position as long as the inlet pressure of the fluid remains above the setting of the relief valve 24. If the inlet pressure should drop to or below the setting of valve 24, passage 17 is closed automatically by ball 27 and the pressure of the fluid below piston 13 decreases rapidly. The pressure fluid from inlet 15 then acts on disc 11 to move it to its seat 14 thereby preventing further discharge from the outlet 16.

There is also provided a constant sump drainage from recess 3 to sump outlet 33. This is made possible by passage 54 which receives any leakage of fluid from recess 3 and carries the leakage into an elongated recess 55. The elongated recess 55 is formed open to similar recesses 56 and 57 which have raised portions 58 and 59. The inside diameter of the raised portions 58 and 59 being concentric to the inside diameters of passages 30 and 31 and the outside diameter of raised portions 58 and 59 being slightly larger, form continuous passages from passage 30 to passage 21 and from passage 31 to passage 32. Any leakage around raised portions 58 and 59 will be carried from recesses 56 and 57 to recess 55 and down to recess 60, which is open to passage 61 in auxiliary body 22 and to sump outlet 33. When the entire valve assembly is in an inoperative position, means for draining leakage from recess 42 in auxiliary body 22 is provided by passage 62 which leads directly to sump outlet 33. In an operative position passage 62 is closed by a land 53 of valve 39.

Thus it is seen that the invention provides a pressure responsive valve for use with high pressure hydraulic systems, wherein discharge from the valve, regardless of the position of the operating lever, is dependent on the inlet pressure to the valve remaining above a set figure.

We claim:

A fluid pressure responsive valve for use in high pressure hydraulic systems comprising a casing, a main valve body therein, an inlet and an outlet for pressure fluid in said main valve body, a valve stem with a disc having a seat within the main valve body for preventing pressure fluid flow from the inlet to the outlet in said main valve body, an adjustable pressure relief valve associated with the pressure fluid as received in the main valve body from the inlet, an auxiliary valve body, passages within the main valve body to direct fluid, under greater pressure than a predetermined setting of the relief valve, from the relief valve to said auxiliary valve body, an inlet and an outlet and a sump outlet in said auxiliary valve body, a valve stem with a disc having a seat within the auxiliary valve body to prevent pressure fluid flow from the inlet to the outlet, an operating lever pivoted to said auxiliary valve body and having two legs, each engaging one end of the valve stem, for displacing the valve stem disc from its seat and for closing off the sump outlet simultaneously thereby allowing pressure fluid flow from the inlet to the outlet, a passage in the main valve body to receive pressure fluid from the auxiliary valve body outlet and a piston secured to the end of the valve stem disc and operating in response to the receiving of pressure fluid in the main valve body from the auxiliary valve body for providing for a discharge from the main valve outlet.

ROBERT J. BREIT.
HERMAN C. SCHROEDER.

REFERENCES CITED

The following references are of record in the file of this patent:

UNITED STATES PATENTS

| Number | Name | Date |
| --- | --- | --- |
| 190,712 | DuBrul | May 15, 1877 |
| 680,852 | Foster | Aug. 20, 1901 |
| 1,087,399 | Phelps | Feb. 17, 1914 |
| 1,091,762 | Phelps | Mar. 31, 1914 |
| 2,043,632 | Stover | June 9, 1936 |
| 2,092,670 | Hess | Sept. 7, 1937 |
| 2,239,148 | Ernst | Apr. 22, 1941 |
| 2,278,249 | Davis | Mar. 31, 1942 |
| 2,375,411 | Grant | May 8, 1945 |